United States Patent [19]

Jensen et al.

[11] Patent Number: 4,821,179
[45] Date of Patent: Apr. 11, 1989

[54] COMMUNICATION SYSTEM CONFIGURATION DETECTION APPARATUS AND METHOD

[75] Inventors: Craig W. Jensen, Aberdeen; Frederick R. Keller, Howell, both of N.J.; Joel I. Morrow, Brooklyn, N.Y.; Eric A. Roth, Boulder, Colo.

[73] Assignees: American Telephone and Telegraph Company, New York, N.Y.; AT&T Information Systems, Morristown, N.J.

[21] Appl. No.: 763,636

[22] Filed: Aug. 8, 1985

[51] Int. Cl.⁴ .............................................. G06F 13/00
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 4,001,786 | 1/1977 | Boehm | 364/200 |
| 4,188,664 | 2/1980 | Deshon | 364/200 |
| 4,207,609 | 6/1980 | Luiz et al. | 364/200 |
| 4,268,901 | 5/1981 | Subrizi et al. | 364/200 |
| 4,268,904 | 5/1981 | Suzuki et al. | 364/200 |
| 4,285,039 | 8/1981 | Patterson et al. | 364/200 |
| 4,383,297 | 5/1983 | Wheatley et al. | 364/200 |
| 4,403,303 | 9/1983 | Howes et al. | 364/900 |
| 4,442,504 | 4/1984 | Dummermuth et al. | 364/900 |
| 4,466,079 | 8/1984 | Daniels et al. | 364/900 |
| 4,468,729 | 8/1984 | Schwartz | 364/200 |
| 4,475,155 | 10/1984 | Oishi et al. | 364/200 |
| 4,485,437 | 11/1984 | Kinghorh | 364/200 |
| 4,500,958 | 2/1985 | Manton et al. | 364/200 |
| 4,502,113 | 2/1985 | Katoh | 364/200 |
| 4,535,448 | 8/1985 | Baxter et al. | 370/85 |
| 4,571,676 | 2/1986 | Mantellina et al. | 364/200 |
| 4,589,063 | 5/1986 | Shah et al. | 364/200 |
| 4,622,633 | 11/1986 | Ceccon et al. | 364/200 |

Primary Examiner—Gareth D. Shaw
Assistant Examiner—V. Nguyen
Attorney, Agent, or Firm—John A. Caccuro

[57] ABSTRACT

A data processing system includes a processor unit (CPU) connected over a CPU bus to a plurality of memory components, but is not connected to any input-output (I/O) component of the system. The system I/O component(s) connect to the memories over an I/O bus. A method and apparatus is disclosed for selecting one of the memories to be used for communications between the processor unit and the I/O components. Also, a method for determining which I/O components are in the system.

9 Claims, 3 Drawing Sheets

COMMUNICATION SYSTEM CONFIGURATION DETECTION APPARATUS AND METHOD

TECHNICAL FIELD

This invention relates to a method and apparatus for providing communication between various components of a communication system which are interconnected using a multiple bus arrangement.

BACKGROUND OF THE INVENTION

A processor controlled communication system may include one or more Processor Elements each including a central processing unit (CPU), one or more memory components and one or more input/output (I/O) components. Each memory component provides program and data storage while each I/O component interfaces the communication system to any of a variety of data handling devices. The total number of memories and I/O components within a Processing Element may not be known in advance nor is the ordering or physical location of these components within the Processing Element. Hence, the configuration of a Processing Element is not known, moreover, it can change from time to time. The configuration of a Processing Element can be readily ascertained when a data bus interconnects the CPU to all of the memories and I/O components. However, in some system architectures it is not cost effective to require complete connectivity (i.e., a data bus) between the CPU and the memory components and I/O components.

One such arrangement exhibiting incomplete connectivity includes a CPU connected over a CPU data bus only to the memories, while the memories are connected over a separate I/O data bus only to the I/O components. In that arrangement the CPU is only connected to the I/O components over an interrupt bus which does not support the transmission of arbitrary data thereover. Because the CPU does not have a data connection to the I/O components, a problem exists during power-up or initialization when the CPU has to identify I/O components and configure them into the system.

SUMMARY OF THE INVENTION

According to the present invention the CPU uses a particular selection rule to select one of said memories through which communication between the CPU and I/O components will be made. The CPU sends an initialization signal over the interrupt bus to the I/O components which causes the I/O components to independently select which of the memories, using the same selection rule used by the CPU, is to be used for communications with the CPU and enters responses therein. The CPU then checks the selected memory component for responses from the I/O components. If the I/O components selected the same memory, i.e., the one selected by the CPU, the CPU can identify the I/O components and configure the system using the I/O responses. If, however, the I/O components select a memory other than the selected memory, then the CPU does not receive the I/O responses and system configuration cannot occur. When tihs occurs a recovery mode is entered during which the CPU disconnects all I/O components and then selectively reconnects them one at a time to determine in which I/O component or memory component the problem exists.

BRIEF DESCRIPTION OF THE DRAWING

The operation of the present invention will be more apparent from the following detailed description taken in conjunction with the drawings in which.

DETAILED DESCRIPTION

Figure 1:
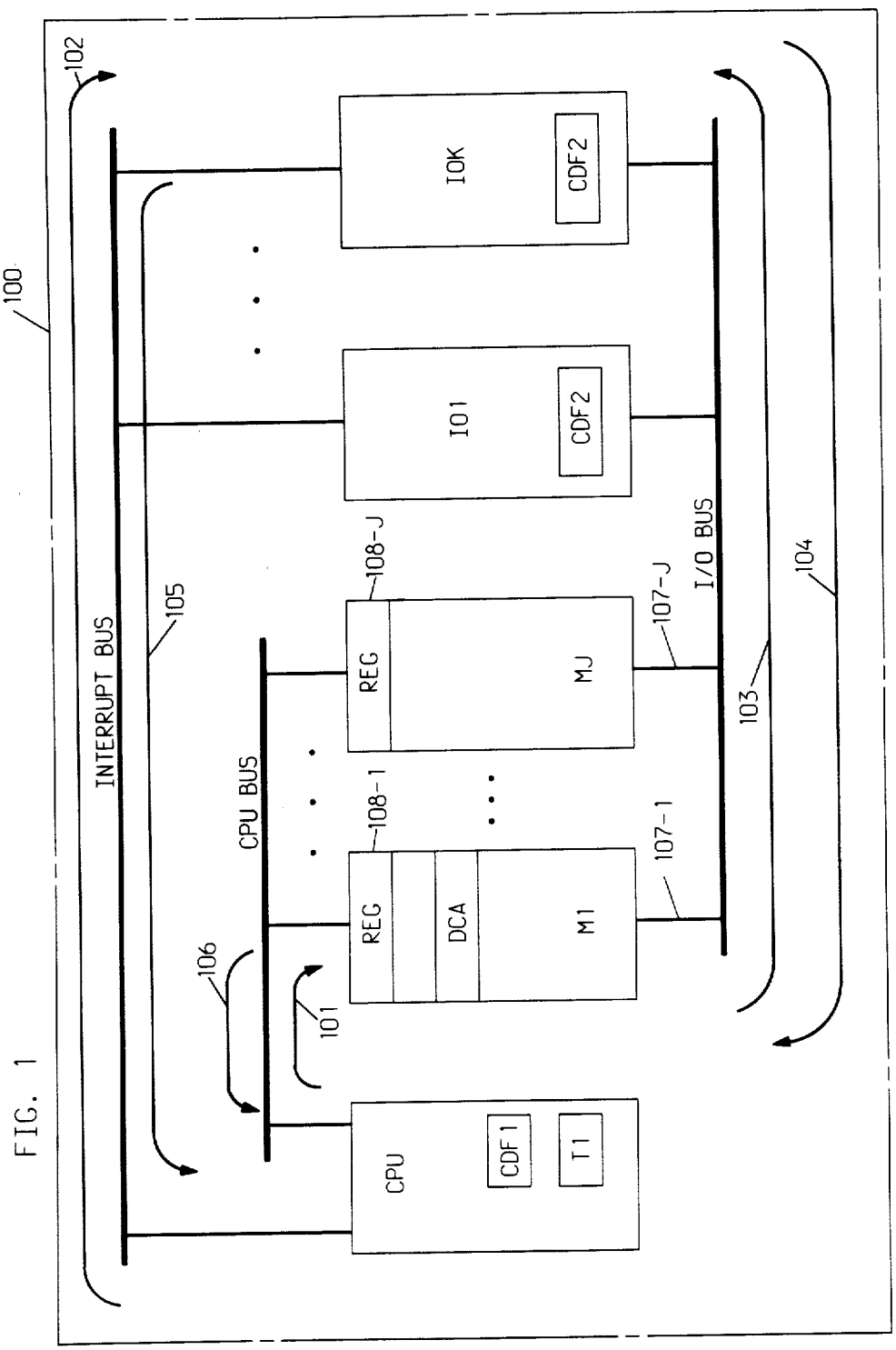
FIG. 1 shows a block diagram of a data processing system useful for describing the present invention.

Referring to FIG. 1, there is shown a data processing system 100 useful in describing the present invention. The system includes a central processor unit CPU, memory components M1 through MJ and input-output I/O components IO1 through IOK. The memory components M1-MJ provide program and data storage. The I/O components IO1-10K provide an interface to a variety of data handling devices (not shown). The processor CPU is connected to memories M1-MJ by the CPU bus. The I/O circuits IO1-IOK are connected to memories M1-MJ by the I/O bus. The processor CPU is connected to I/O components IO1-IOK by the Interrupt Bus. The Interrupt bus is a bidirectional signaling bus and is not designed for data transfer between processor CPU and I/O components IO1-IOK. The CPU, memory components M1-MJ, I/O components IO1-IOK, CPU bus, I/O bus, interrupt bus can be any of a variety of well-known equipment, the particular operation of which will be described only when relevant to the understanding of the present invention.

In normal operation, the processor CPU stores an I/O command, 101, in memory M1 and then generates an interrupt, 102, to an I/O circuit (IOK) to which the command is intended. On receiving the interrupt, I/O component IOK fetches, 103, the command from memory M1 and executes it. Thereafter I/O component IOK stores a response, 104, in memory M1 and generates an interrupt, 105, for processor CPU. Processor CPU receives the interrupt and then fetches the response, 106, from memory M1.

It should be noted that when system 100 is first assembled, processor CPU does not know how many memory components M1-MJ or I/O components IO1-IOK are present in the system. Obviously, when more than one memory exists the CPU and I/O components would have to choose the same memory to enable communication therebetween. However, when only one memory exists the problem is its address is initially unknown. Thus, the process of the present invention still has to run, but in this special case, it will just run more quickly (and recovery mode would not be needed).

The number of I/O components in the system can also be one or more. Moreover, the configuration, i.e., the ordering or physical location of these memory and I/O components within the system, is not known and may change when changes in the operating size or feature capability are made to the system. Because the interrupt bus provides only signaling capability but no data exchange connectivity between the CPU and I/O components IO1-IOK, data transfer must occur via one of the memory components M1-MJ. However, since there are multiple memory components M1-MJ, one memory circuit must be selected to enable CPU and I/O components IO1-IOK to exchange data. Moreover, if one or more memory component connections 107-1 through 107-J are inoperative, a further complication is added to selecting a memory component for data exchanges between the CPU and I/O components IO1-IOK.

The method and apparatus of the present invention determine the memory component to be used for data transfers between the CPU and I/O components. The present invention performs an automatic configuration detection facility (CDF) whereby the CPU discovers the type and location of the various components which comprise system 100 each time the system is started-up. The process is initiated in response to power-up or initialization signals. The CDF includes one part, CDF1, located in the CPU and a second part, CDF2, located in each I/O component. The CDF operation is performed primarily by the CPU part CDF1, with some functions being performed by CPF2 of each of the I/O components. In general the CDF1 sends queries to all components M1-MJ, IO1-IOK, that are potentially present in system 100. Based on the responses to the queries or the lack thereof (in the case of absent components) the CDF1 constructs a table T1 in memory. This table describes the configuration of system 100 as it exists at this particular point in time.

Figure 2:
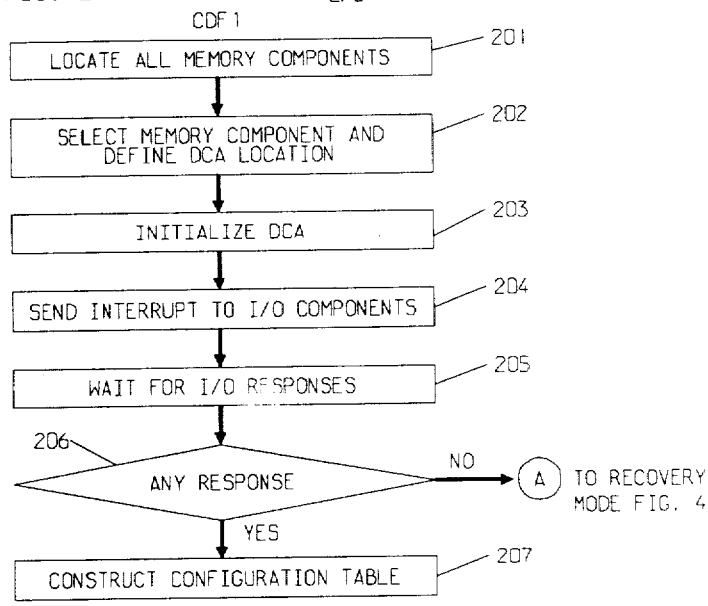
FIG. 2 shows a flowchart of one part of the automatic configuration detection facility (CDF), designated CDF1, which is located in the CPU.

With joint reference to FIGS. 1 and 2, the operation of CDF1 which is located in the CPU is described. The program which controls the CDF1 operation is stored in ROM memory in CPU. In step 201 CDF1 locates all of the memory components. Each memory component has a board code register, e.g., 108-1 for memory M1, that is read as a simple memory-mapped address. The address of the board code register is a function of the backplane slot number in which the memory component is installed. There are J potential memory slots, and therefore J potential board code register addresses. The CDF1 attempts to read the board code register for slot 1. If a memory component is installed in slot 1, CDF1 obtains the contents of its board code register. Thereafter, CDF1 deduces other information, such as the size or capacity of the memory component. If no memory component is installed in slot 1, or if the memory component is non-functional, the attempt to read the board code register results in a CPU bus timeout. The CDF1 interprets the timeout to mean that no memory component is installed in slot 1. The CDF1 steps through each of the J memory slots in this manner, and then constructs table T1 that describes each of the memory components M1 through MJ.

In step 202, CDF1 defines a device communication area (DCA) location. Each I/O component stores some identifying information about itself in one of the memory components, in a region of memory called the DCA. The location (memory address) of the DCA has to be decided dynamically, because there is no particular range of memory addresses that is guaranteed to be present in every system. Based on the information that was obtained in step 201, a memory component is selected in step 202, by a predetermined rule from the available memory components, to contain the DCA. In the illustrative disclosed embodiment the memory component selected is the one that physically occupies the lowest-numbered memory slot, i.e., M1. The DCA is then defined to occupy the first 2K-bytes of that memory component.

In step 203, CDF1 initializes the DCA by storing a pattern of zeros throughout the DCA. In step 204, CDF1 generates an interrupt or initialize signal to each of the I/O components, IOK-IOK. The I/O components are addressed by slot number along the interrupt bus. If a given slot is not occupied by an I/O component, the interrupt to that slot is simply ignored and therefore CDF1 receives no report from that slot.

In step 205 CDF1 waits for the I/O components to respond. Each I/O component determines which memory DCA in which to store its identifying information within a specified time limit after it receives its interrupt from the CPU. The CDF1 in the CPU pauses for this amount of time and then identifies a selected memory and checks the DCA to determine which I/O components have responded.

In step 206, if any responses are received from the I/O components, CDF1 adds them to the configuration table, T1, during step 207. At this point, CDF1 has identified all the memory components and all the I/O components that are installed in system 100, and it can complete construction of the configuration table T1 in memory M1.

If no response is received from any of the I/O components, CDF1 performs the recovery mode operation of FIG. 4, which will be described in a later paragraph.

Figure 3:
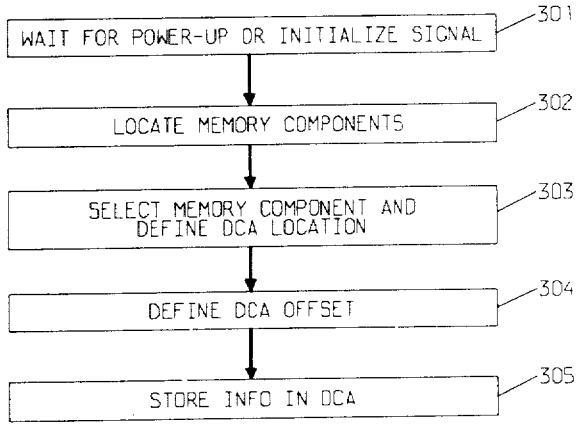
FIG. 3 shows a flowchart of a second part of the CDF, designated CDF2, which is located in each I/O component.

The operation of CDF2 located in each I/O component is described with reference to FIG. 3. The process begins in step 301 on power-up or after an initialize command from the CPU. CDF2 waits for an interrupt from the CPU (corresponding to step 204 of FIG. 2 above). In step 302, each CDF2 locates the memory components M1-MJ. The operation is similar to 201, except that all I/O components access all of the memory components via the I/O bus. During step 303, CDF2 selects a memory component and defines the DCA location using the same operations as in step 202 of FIG. 2. However, the result of this operation could be incompatible with step 202 if the lowest memory component M1 malfunctions. This situation is discussed in a later paragraph.

In step 304 the CDF2 defines the DCA offset at the DCA location. The DCA is defined to have K equal-sized regions (i.e., one for each I/O component). Region 1 is dedicated to I/O slot 1, region 2 is dedicated to I/O slot 2, and so on. The I/O component can sense which I/O slot it is installed in, and it uses this information to locate its assigned region in the DCA. Finally in step 305 each I/O component stores identifying information about itself in the DCA. The CDF (CDF1 and CDF2) has then completed the configuration of the system and normal system operation begins.

Figure 4:
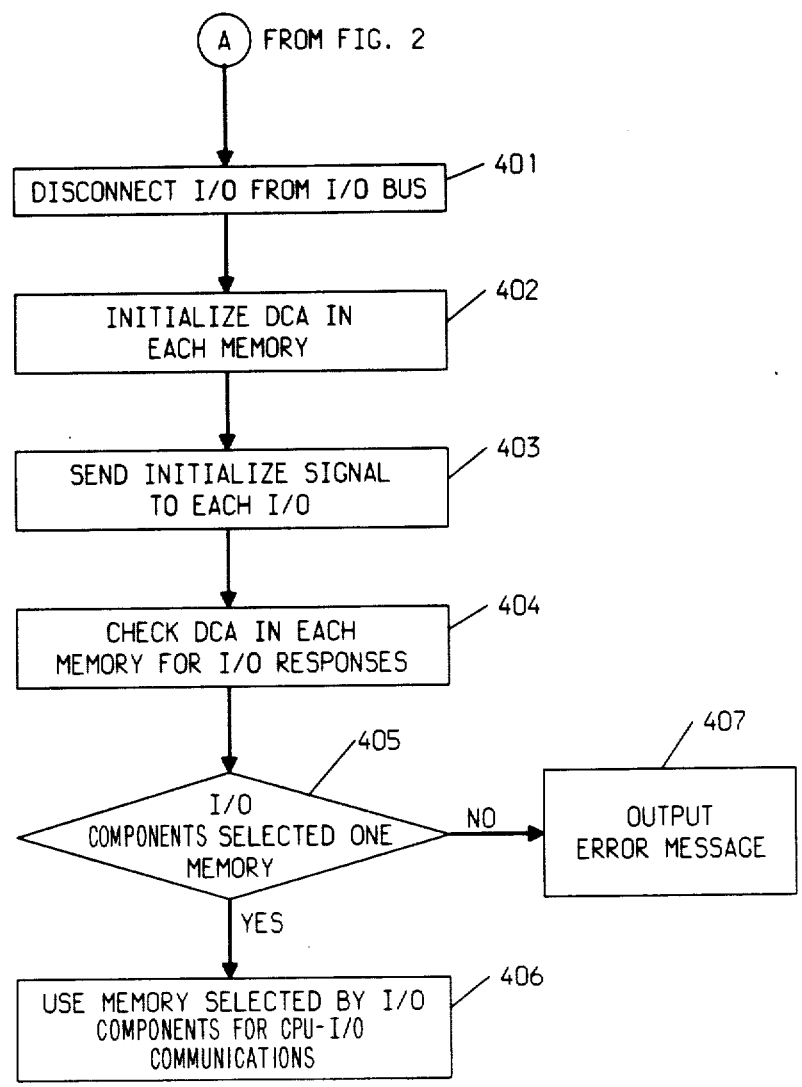
FIG. 4 shows a flowchart of the recovery mode operation of CDF1.

In the event that no response is received from an I/O component the CDF recovery mode of FIG. 4 is entered. This occurs when CDF1 and CDF2 have selected, respectively, using the results of steps 202 of FIG. 2 and 303 of FIG. 3 above, different memory components to use as the DCA. If the lowest-numbered memory component M1 is fully functional, CDF1 of the CPU and CDF2 of the I/O components select the same memory for the DCA location. However, if the lowest-numbered memory component M1 is semi-functional, then CDF1 and CDF2 select different memories for the DCA location. Semi-functional means the memory component is functional on one of the buses but non-functional on the other bus. For example, if the connection 107-1 between memory M1 and I/O bus was not operational then CDF1 would select memory M1 to hold the DCA while CDF2 would select memory M2 to hold the DCA. In such a situation if CDF1 does not observe any activity in the DCA (no I/O components have reported in after a specified amount of time) CDF1 automatically enters the recovery mode. In the recovery mode, every memory component M1-MJ becomes a candidate for the DCA.

The operation of the recovery mode is described with reference to FIG. 4. In step 401 the CPU sends a disconnect signal to each of the K I/O slots in the system (i.e., via the interrupt bus). This causes each I/O component IO1-IOK to disconnect from the I/O bus and hence to cease all activity with the memory components.

In step 402 the CPU initializes the first 2K-byte region (the potential DCA) in each memory component M1-MJ that is known with respect to the CPU bus (from step 201 of FIG. 2). The CPU sends, step 403, an initialize signal to each I/O slot. This causes each I/O component to reconnect to the I/O bus and to begin the search for a DCA memory component. The CPU pauses for a specified amount of time. It then inspects, in step 404, the potential DCA region in each known memory component M1-MJ to see which memory, if any, the I/O components are trying to use. If the CPU concludes that exactly one DCA region in being used by all of the I/O components, 406, the CPU can begin normal operation using that memory. Otherwise, the CPU is not capable of normal operation and an appropriate error message, 407, is outputted to the system user. The system user then takes the proper steps to remedy the problem.

After the problem is corrected, the system is reinitialized, properly reconfigured and normal CPU-I/O communication can proceed. The CDF1 checks, 405, if all I/O components have selected only one DCA.

What has been described is merely illustrative of our invention, other embodiments known to these skilled in the art could be utilized without departing from the spirit and scope of the present invention. Additionally, applications to communication systems other than the disclosed system are contemplated as being within the knowledge of one skilled in the art.

What is claimed is:

1. In a data processing system including a processor connected over a CPU bus to a plurality of read/write memories, said memories connected over an I/O bus to an I/O interface and wherein said CPU bus connects to said I/O bus using said memories, a method of selecting one of said memories for enabling communication between said processor and said I/O interface comprising the steps of:
   in said processor
      selecting in response to a control signal one of said memories as a selected memory using a particular selection rule,
      sending an initialize signal to said I/O interface,
      checking said selected memory for a response from said I/O interface and
   in said I/O interface
      determining using said particular selection rule and in response to said initialize signal, which one of said memories is to store said response from said I/O interface.

2. The method of claim 1 wherein said checking step is performed at a defined device communication area of said selected memory.

3. The method of claim 1 wherein said checking step waits for a given period of time before checking the defined area of said selected memory.

4. The method of claim 1 wherein said selected memory is selected in response to a system power-up signal.

5. The method of claim 1 wherein said system includes two or more I/O interfaces and no response is obtained in said selected memory from said I/O interfaces during said checking step, said system including the steps of:
   disconnecting each of said I/O interfaces from said I/O bus,
   initializing a defined device communication area of each of said memories,
   reinitializing each of said I/O interfaces, and
   wherein said checking step further checks each of said memories for responses to determine if responses are contained in only one of said memories.

6. The method of claim 5 further including the step of:
   outputting an error message when said checking step determines that more than one of said memories contain responses from said I/O interfaces.

7. The method of claim 5 further including the step of:
   selecting one of said memories for communications between said processor and said I/O interfaces when said selected memory received all responses from said I/O interfaces.

8. A data processing system including a processor connected over a CPU bus to a plurality of read/write memories, said memories connected over an I/O bus to an I/O interface, wherein said CPU bus is not connected to said I/O bus, and wherein said processor communicates with said I/O interface via a selected one of said memories, said system further comprising
   in said processor
      means for selecting in response to a control signal one of said memories as a selected memory using a particular selection rule,
      means for sending an initialize signal to said I/O interface,
      means for checking said selected memory for a response from said I/O interface and
   in said I/O interface
      means using said particular selection rule and responsive to said initialize signal for determining which one of said memories is to store said response from said I/O interface.

9. The data processing system of claim 8 including two or more of said I/O interfaces, said system further comprising
   means for disconnecting each of said I/O interfaces from said I/O bus,
   means for initializing a device communication area of each of said memories,
   means for reinitializing each of said I/O interfaces, and
   means for selecting one of said memories for communications between said processor and said I/O interface when said selected memory received all responses from said I/O interfaces.

* * * * *